US007286540B2

(12) United States Patent
Kim et al.

(10) Patent No.: US 7,286,540 B2
(45) Date of Patent: Oct. 23, 2007

(54) METHOD FOR ALLOCATING HARQ CHANNEL NUMBER FOR INDICATING STATE INFORMATION IN AN HSDPA COMMUNICATION SYSTEM

(75) Inventors: Sung-Hoon Kim, Seoul (KR); Hyeon-Woo Lee, Suwon-shi (KR); Kook-Heui Lee, Songnam-shi (KR); Joon-Goo Park, Seoul (KR); Ju-Ho Lee, Suwon-shi (KR); Sung-Ho Choi, Songnam-shi (KR); Jin-Weon Chang, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 1064 days.

(21) Appl. No.: 10/226,067

(22) Filed: Aug. 21, 2002

(65) Prior Publication Data
US 2003/0043764 A1 Mar. 6, 2003

(30) Foreign Application Priority Data
Aug. 23, 2001 (KR) ............................... 2001-50949

(51) Int. Cl.
*H04L 12/28* (2006.01)
*H04L 12/56* (2006.01)
(52) U.S. Cl. ...................................... 370/394; 370/474
(58) Field of Classification Search ................ 370/389, 370/394, 474, 329, 341, 328, 431; 714/746, 714/748–750
See application file for complete search history.

(56) References Cited

U.S. PATENT DOCUMENTS

| 5,130,986 | A | * | 7/1992 | Doshi et al. ................. 370/231 |
| 2002/0150048 | A1 | * | 10/2002 | Ha et al. ..................... 370/231 |
| 2002/0154602 | A1 | * | 10/2002 | Garcia-Luna-Aceves et al. | 370/230 |

\* cited by examiner

*Primary Examiner*—Ajit Patel
(74) *Attorney, Agent, or Firm*—The Farrell Law Firm, P.C.

(57) ABSTRACT

There is provided a method for allocating channel numbers to channel signals by a Node B, which repeatedly transmits a stream of n channel signals to a UE (User Equipment), each of the channel signals including a channel number and transmission data, the n channel signals having (n+1) different channel numbers, each channel having a given transmission time interval (TTI). The method comprises storing channel numbers of the n channel signals in a transmission window, and updating channel numbers such that n channel numbers are stored each time channel signals are transmitted; and allocating the same channel number as a channel number used for initial transmission to a channel signal to be transmitted if the channel signal to be transmitted is a retransmission channel signal, and allocating a channel number not belonging to the transmission window among the (n+1) channel numbers to a channel signal to be transmitted if the channel signal to be transmitted is an initial-transmission channel signal.

12 Claims, 10 Drawing Sheets

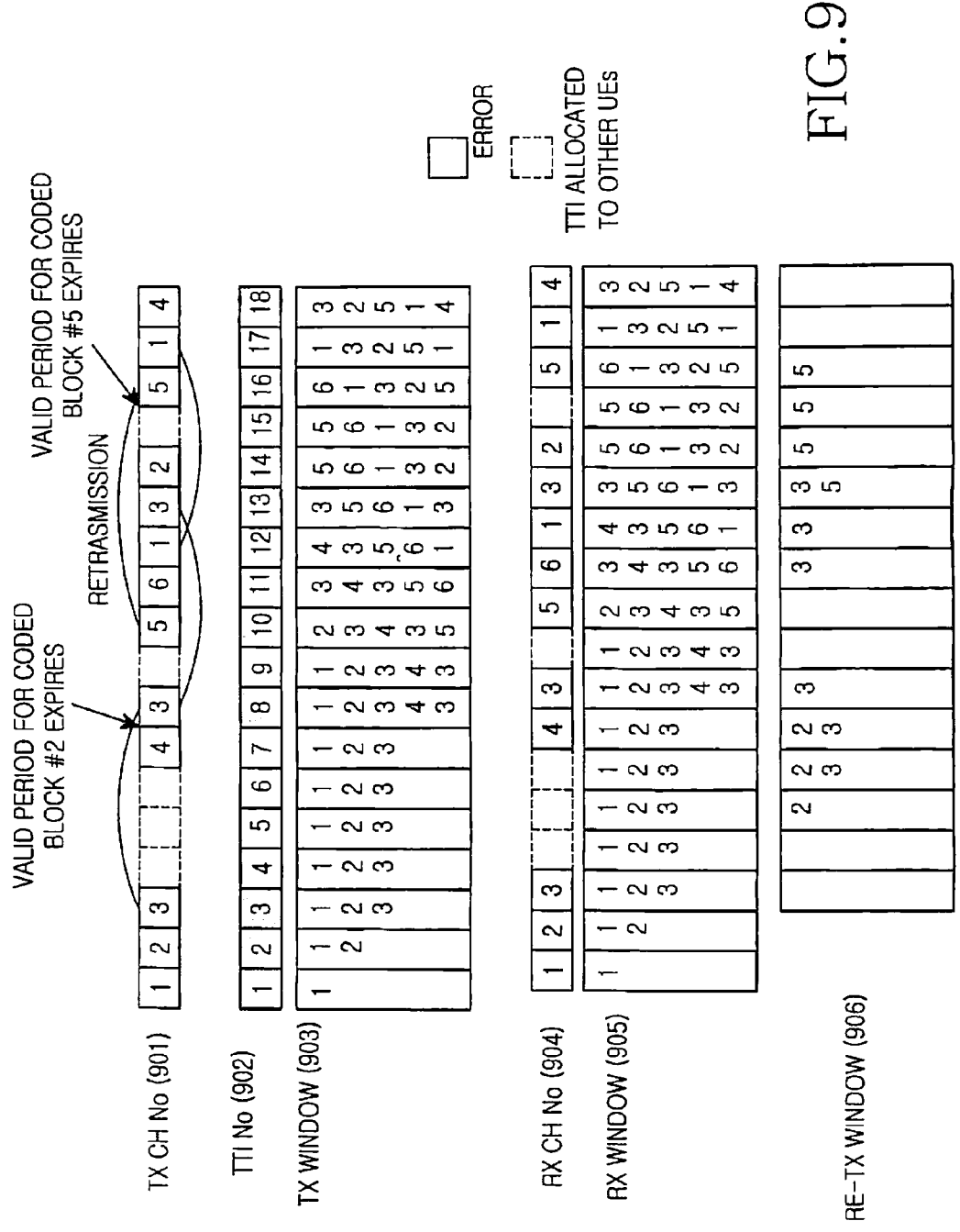

METHOD FOR ALLOCATING HARQ CHANNEL NUMBER FOR INDICATING STATE INFORMATION IN AN HSDPA COMMUNICATION SYSTEM

PRIORITY

This application claims priority to an application entitled "Method for Allocating HARQ Channel Number for Indicating State Information in an HSDPA Communication System" filed in the Korean Industrial Property Office on Aug. 23, 2001 and assigned Serial No. 2001-50949, the contents of which are hereby incorporated by reference.

BACKGROUND OF THE INVENTION

1. Field of the Invention

The present invention relates generally to an HSDPA (High-Speed Downlink Packet Access) communication system, and in particular, to a method for allocating HARQ (Hybrid Automatic Retransmission Request) channel identifiers using an n-channel SAW HARQ technique.

2. Description of the Related Art

In general, HSDPA (High-Speed Downlink Packet Access) refers to a technique for transmitting data including control channels related to a high-speed downlink shared channel (HS-DSCH) for supporting high-speed packet transmission in an UMTS (Universal Mobile Telecommunications System) communication system which has been developed centering on Europe. In order to support the HSDPA, AMC (Adaptive Modulation and Coding), HARQ (Hybrid Automatic Retransmission Request), and FCS (Fast Cell Select) have been proposed. With reference to FIG. 1, the AMC, the HARQ and the FCS will be described herein below in conjunction with the UMTS communication system.

FIG. 1 schematically illustrates a structure of a general UMTS communication system. Referring to FIG. 1, the UMTS communication system includes a core network (CN) 100, a plurality of radio network subsystems (RNSs) 110 and 120, and a user equipment (UE) 130. The RNSs 110 and 120 each include a radio network controller (RNC) (111, 121) and a plurality of Node Bs, also known as "cells." For example, the RNC 110 includes an RNC 111 and a plurality of Node Bs 113, 115 and 123, 125. The RNC is classified into a Serving RNC (SRNC), a Drift RNC (DRNC) and a Controlling RNC (CRNC) according to its role. The SRNC and the DRNC are classified according to their roles for each UE, and an RNC managing information on the UE and controlling data exchange with a core network becomes an SRNC of the UE. When data from a UE is transmitted to the SRNC via another RNC except an SRNC, the corresponding RNC becomes a DRNC of the UE. The CRNC represents an RNC controlling each Node B. For example, in FIG. 1, if information on the UE 130 is managed by the RNC 111, the RNC 111 becomes an SRNC. If data from the UE 130 is transmitted through the RNC 121 due to a movement of the UE 130, then the RNC 121 becomes a DRNC. Further, the RNC 111 controlling the Node B 113 becomes a CRNC of the Node B 113.

First, the AMC is a data transmission technique for adaptively determining a modulation technique and a coding technique of different data channels according to a channel condition between the Node B 123 and the UE 130 of FIG. 1, thereby to increase the overall utilization efficiency of the cell. Therefore, the AMC involves a plurality of modulation techniques and a plurality of coding techniques, and modulates and codes data channels by combining the modulation techniques and the coding techniques. Generally, each of combinations of the modulation techniques and the coding techniques is called "MCS (Modulation and Coding Scheme)", and a plurality of MCS levels can be defined according to the number of combinations of the modulation techniques and the coding techniques. In other words, the AMC adaptively determines an MCS level according to a channel condition between the UE 130 and the Node B 123 currently wirelessly connected to the UE 130, thereby increasing the overall system efficiency.

Next, the FCS is a technique for rapidly selecting a cell having a good channel condition among a plurality of cells, when a UE supporting the HSDPA enters a cell-overlapping region, or a soft handover region. To be specific, if the UE 130 supporting the HSDPA enters a cell-overlapping region between the Node B 123 and a Node B 125, then the UE 130 establishes radio links to a plurality of the cells, i.e., a plurality of Node Bs. A set of the cells, to which the radio links are established by the UE, is called an "active set." The FCS receives HSDPA packet data from only the cell maintaining the best channel condition among the cells included in the active set, thereby to reduce the overall interference. Herein, a cell transmitting the HSDPA packet data for its best channel condition among the cells in the active set is called a "best cell." The UE periodically checks the channel conditions with the cells belonging to the active set. Upon detecting a cell having a channel condition better than that of the current best cell, the UE transmits a best cell indicator to all of the cells in the active set in order to exchange the best cell. The best cell indicator includes an identifier of the selected new best cell. Upon receiving the best cell indicator, the cells belonging to the active set analyze the cell identifier included in the received best cell indicator to determine whether the received best cell indicator is destined for them. The selected best cell transmits packet data to the corresponding UE using a high-speed downlink shared channel (HS-DSCH).

Finally, the n-channel SAW HARQ (n-channel Stop And Wait HARQ), will be described. In order to increase efficiency of the existing ARQ (Automatic Retransmission Request), the n-channel SAW HARQ has introduced two plans; one is soft combining and another is HARQ.

Soft Combining

The soft combing is a technique for temporarily storing defective data at a receiver and then combining the stored defective data with a retransmitted part of the corresponding data, thus to decrease an error rate. The soft combing technique is divided into a Chase Combining (CC) technique and an Incremental Redundancy (IR) technique.

In the CC, a transmitter uses the same format at initial transmission and retransmission. If m symbols were transmitted over one coded block at initial transmission, the same m symbols are transmitted even at retransmission. Here, the "coded block" represents user data transmitted for one TTI (Transmission Time Interval). That is, the same coding rate is applied to the initial transmission and the retransmission. A receiver then combines the initially transmitted coded block with the retransmitted coded block, and performs a CRC (Cyclic Redundancy Check) operation on the combined coded block to determine whether an error occurs.

In the IR, a transmitter uses different formats at initial transmission and retransmission. If n-bit user data was generated into m symbols through channel coding, the transmitter transmits a part of the m symbols at initial transmission, and sequentially transmits the remaining parts at retransmission. That is, a coding rate for initial transmission is different from a coding rate for retransmission. A receiver then assembles a coded block with a high coding rate by attaching the retransmitted parts to the tail of the initially transmitted coded block, and performs error correction on the assembled coded block. In the IR, the initial transmission and each retransmission are identified by a version number. The initial transmission has a version number 1, a first retransmission has a version number 2, and a second retransmission has a version number 3. The receiver can correctly combine the initially transmitted coded block with the retransmitted coded block using the version number.

HARQ

In the SAW HARQ, the Node B does not transmit the next packet data until ACK (Acknowledgement) for the previously transmitted packet data is received. Therefore, in some cases, the Node B must await ACK, though it can presently transmit packet data. The n-channel SAW HARQ increases utilization efficiency of a radio link by continuously transmitting a plurality of data packets before receiving the ACK for the previously transmitted packet data. That is, in the n-channel SAW HARQ, n logical channels are established between a UE and a Node B and identified by time or channel numbers, so that the UE, upon receipt of packet data at a certain time point, can determine the logical channel that transmitted the packet data. Thus the UE can rearrange packet data in the right reception order or soft-combine the packet data.

Now, an operation of the n-channel SAW HARQ will be described in detail with reference to FIG. 1. First; it will be assumed that the n-channel SAW HARQ, particularly 4-channel SAW HARQ is performed between the UE 130 and the Node B 123, and the 4 channels are assigned unique logical identifiers #1 to #4. Physical layers of the UE 130 and the Node B 123 have HARQ processors associated with the respective channels. The Node B 123 assigns a channel identifier #1 to an initially transmitted coded block before transmission to the UE 130. Here, the channel identifier can be assigned either specifically or implicitly. When the coded block assigned the channel identifier #1 has a transmission error, the UE 130 delivers the defective coded block to an HARQ processor #1 associated with the channel identifier #1, and transmits a NACK (Negative Acknowledgement) signal for a channel #1 to the Node B 123. The Node B 123 can transmit the next coded block over a channel #2 regardless of whether ACK for the coded block on the channel #1 is received or not. If the next coded block also has an error, the Node B 123 delivers the next coded block to the corresponding HARQ processor. Upon receiving NACK for the coded block on the channel #1 from the UE 130, the Node B 123 retransmits the corresponding coded block over the channel #1, and the UE 130 recognizes retransmission of the coded block previously transmitted over the channel #1 by analyzing the channel identifier of the retransmitted coded block, and delivers the retransmitted coded block to the HARQ processor #1. Upon receiving the retransmitted coded block, the HARQ processor #1 soft-combines the initially transmitted coded block stored therein with the retransmitted coded block. In this way, the n-channel SAW HARQ matches the channel identifiers with the HARQ processors on a one-to-one basis, thereby properly matching initial transmission with retransmission without a delay in transmitting user data until ACK is received.

Next, a structure of a transmitter for supporting the n-channel SAW HARQ will be described with reference to FIG. 2. FIG. 2 is a block diagram illustrating a structure of a general transmitter supporting the n-channel SAW HARQ.

Referring to FIG. 2, a transmitter for supporting the n-channel SAW HARQ includes a receiver 260, a transmission buffer 210, a CRC operator 220, a turbo encoder 230, a scheduler 270, a plurality of HARQ channel retransmission buffers (i.e., first HARQ channel retransmission buffer 240 to $n^{th}$ HARQ channel retransmission buffer 243), an HARQ channel controller 280, and a transmitter 250.

The receiver 260 receives control information transmitted by a UE through Uu interface, i.e., a radio link, performs such channel reception processing as de-channelization on the received control information, and provides HARQ-related feedback information included in the de-channelized information to the transmission buffer 210 and the HARQ channel controller 280. Here, the control information transmitted from the UE may include channel quality information (CQI) and ACK/NACK information, and the receiver 260 provides the ACK/NACK information included in the control information to the transmission buffer 210 and the HARQ channel controller 280. In addition, the scheduler 270 schedules an initial transmission point and a retransmission point of the user data.

The transmission buffer 210 buffers user data transmitted from an upper layer, receives the feedback information output from the receiver 260 and information on the user data transmission point output from the scheduler 270, and provides the buffered user data to the CRC operator 220. If the feedback information is ACK, the transmission buffer 210 outputs buffered new user data, i.e., initially transmitted user data. If the feedback information is NACK, the transmission buffer 210 does not output the buffered new data.

The CRC operator 220 performs a CRC operation on the user data output from the transmission buffer 210, inserts the CRC operation result in the user data (CRC insertion), and provides the CRC-inserted user data to the turbo encoder 230. Although the CRC operator 220 is interposed between the transmission buffer 210 and the turbo encoder 230 in FIG. 2, the CRC operator 220 may be connected to a previous stage of the transmission buffer 210. The turbo encoder 230 encodes the CRC-inserted user data output from the CRC operator 220 according to a preset encoding technique, and provides the coded user data to the HARQ channel controller 280 and the HARQ channel retransmission buffers (i.e., first HARQ channel retransmission buffer 240 to n HARQ channel retransmission buffer 243. Here, a signal output from the turbo encoder 230 is a coded block, and the turbo encoder 230 provides the coded block to an HARQ channel retransmission buffer associated with a channel over which the coded block is to be transmitted. For example, if the coded block encoded by the turbo encoder 230 is a coded block targeting a first channel, the turbo encoder 230 provides the coded block to the first HARQ channel retransmission buffer 240. The HARQ channel controller 280 inserts a channel number in the coded block by receiving feedback information output from the receiver 260, or provides the received coded blocks to the transmitter 250 at associated transmission points, using the transmission points of the respective channels. The transmitter 250 performs such channel transmission processing as modulation and OVSF (Orthogonal Variable Spreading Factor) encoding on the coded blocks output from the HARQ channel controller 280, and transmits the processed coded blocks to a corresponding UE through Uu interface, i.e., a radio link, at transmission points of the corresponding channels. If the coded blocks are transmitted through a plurality of OVSF codes, the transmitter 250 further performs demultiplexing to distribute the coded blocks according to the OVSF codes.

Next, with reference to FIG. 3, a structure of a receiver supporting the n-channel SAW HARQ will be described. FIG. 3 illustrates a structure of a general receiver supporting the n-channel SAW HARQ. Referring to FIG. 3, a receiver supporting the n-channel SAW HARQ includes a receiver 350, a transmitter 360, a turbo decoder 330, a plurality of HARQ channel buffers (i.e., first HARQ channel buffer 340 to $n^{th}$ HARQ channel buffer 343), a CRC operator 320, and a reception buffer 310.

The receiver 350 receives a signal through Uu interface, i.e., a radio link, generates a coded block by performing such received signal processing as demodulation and de-channelization on the received signal, and provides the generated coded block to the turbo decoder 330 and an HARQ channel buffer associated with a channel over which the corresponding coded block is received. For example, if the coded block is received over a first channel, the receiver 350 provides the corresponding coded block to the first HARQ channel buffer 340. The turbo decoder 330 decodes the coded block output from the receiver 350, and provides the decoded coded block to the CRC operator 320. The CRC operator 320 performs a CRC operation on a signal received from the turbo decoder 330, and provides a CRC operation result signal, i.e., ACK or NACK, to a corresponding HARQ channel buffer and the transmitter 360. If the signal output from the turbo decoder 330 has no CRC error, the CRC operator 320 provides ACK to the transmitter 360 and the corresponding HARQ channel buffer. Upon receiving the ACK from the CRC operator 320, the transmitter 360 transmits the ACK to a UE over a corresponding channel on a radio link. In addition, the transmitter 360 discards the coded block stored in the corresponding HARQ channel buffer that received the ACK from the CRC operator 320. Further, the CRC operator 320 provides error-free user data to the reception buffer 310. In contrast, if the signal output from the turbo decoder 330 has a CRC error, the CRC operator 320 provides NACK to the transmitter 360, but does not provide the NACK to the corresponding HARQ channel buffer. That is, a coded block on a channel corresponding to the NACK is continuously stored in the corresponding HARQ channel buffer. Further, the CRC operator 320 discards the defective user data. The reception buffer 310 buffers (temporarily stores) the user data output from the CRC operator 320 and transmits the buffered user data to an upper layer at a proper time point. Here, the reception buffer 310 transmits the buffered user data to the upper layer either sequentially or in the order of reception.

Thereafter, upon receiving a coded block through a radio link, the receiver 350 identifies a channel over which the coded block is received, and determines whether a coded block has been stored in an HARQ channel buffer associated with the identified channel. If no coded block has been stored in the corresponding HARQ channel buffer, the receiver 350 provides the received coded block to both the turbo decoder 330 and the HARQ channel buffer associated with the corresponding channel. However, if a coded block has already been stored in the HARQ channel buffer associated with the channel of the received coded block, the receiver 350 provides the received coded block only to the corresponding HARQ channel buffer and does not provide the received coded block to the turbo decoder 330. The corresponding HARQ channel buffer soft-combines the received coded block provided from the receiver 350 with the previously received coded block that was buffered due to an error, and provides the soft-combined coded block to the turbo decoder 330. The turbo decoder 330 decodes the coded block received from the corresponding HARQ channel buffer, and provides the decoded coded block to the CRC operator 320. The CRC operator 320 performs a CRC operation on the signal output from the turbo decoder 330. If no CRC operation error occurs, the soft-combined coded block is buffered in the reception buffer 310 and transmitted to the upper layer at a proper time point.

As described above, in the n-channel SAW HARQ, a channel plays a role of informing the receiver of an HARQ channel buffer, a coded block stored in which should be soft-combined with the received coded block. That is, in FIG. 3, the receiver 350 analyzes a channel identifier of the received coded block to determine whether a coded block has already been buffered in an HARQ channel buffer associated with a channel of the received coded block. If a coded block has already been buffered in the corresponding HARQ channel buffer, the receiver 350 soft combines the received coded block with the buffered coded block.

As described in conjunction with FIG. 2, the transmitter can transmit a channel identifier to the receiver along with a coded block. This is called asynchronous n-channel SAW HARQ. Alternatively, the transmitter transmits a coded block by matching a specific channel to a specific time point, and the receiver can determine a channel number using a reception point of the coded block. This is called synchronous n-channel SAW HARQ. In the following description, only the asynchronous n-channel SAW HARQ will be taken into consideration. Therefore, in the following description, "n-channel SAW HARQ" refers to the asynchronous n-channel SAW HARQ.

When using the CC, the transmitter should inform the receiver of information indicating whether the coded block was initially transmitted or retransmitted, as well as a channel number of the transmitted coded block. The information indicating whether the corresponding coded block is an initially transmitted coded block or a retransmitted coded block is comprised of one bit and transmitted along with the coded block. If this information is "0," it indicates that the corresponding coded block is an initially transmitted coded block. If the information is "1", it means that the corresponding coded block is a retransmitted coded block. The information indicating whether the corresponding coded block is an initially transmitted coded block or a retransmitted coded block will be referred to as a "New/Continue (N/C) flag."

When using the IR, the transmitter can inform the receiver of version information of the coded block as well as a channel number of the transmitted coded block. Here, the version information has a size, which depends upon the number of versions permitted by the system.

In the following description, only the case where the CC is used will be taken into consideration.

In the n-channel SAW HARQ using the CC, the reason that the transmitter transmits an N/C flag as well as a channel number along with a coded block is to prevent a possible random communication error occurring between the transmitter and the receiver.

Next, a communication error occurring in an HSDPA communication system will be described with reference to FIGS. 4A to 4C.

FIG. 4A illustrates a communication error occurring when a Node B supporting the HARQ mistakes ACK from a UE for NACK in an HSDPA communication system. FIG. 4B illustrates a communication error occurring when a Node B supporting the HARQ mistakes NACK from a UE for ACK in an HSDPA communication system. FIG. 4C illustrates a communication error occurring when a Node B supporting the HARQ fails to receive a coded block in an HSDPA communication system.

Referring to FIG. 4A, a transmitter transmits an initially transmitted coded block #1 with an N/C flag set to New, over a channel #1 at a time point 401. A receiver then receives the coded block #1 with an N/C flag set to New at a time point 402 over the channel #1 transmitted by the transmitter at the point 401, and performs turbo decoding and CRC operation on the coded block #1 to determine whether an error has occurred in the coded block #1. As a result of the CRC operation on the coded block #1, if no error has occurred in the coded block #1, the receiver transmits ACK to the transmitter at a point 403.

However, if an error occurs in the ACK due to a bad radio channel environment on a radio link, the transmitter may mistake the ACK transmitted by the receiver for NACK at a point 404. Then the transmitter decides that the coded block #1 is transmission-failed, and retransmits the coded block #1 with the N/C flag set to Continue indicating retransmission of the coded block over the channel #1 at a point 405. The receiver then receives the coded block #1 with the N/C flag set to Continue over the channel #1 at a point 406. However, since the receiver has already successfully received the coded block #1 at the point 402, the receiver expects that the coded block received at the point 406 is the initially transmitted coded block with the N/C flag set to New. However, since an N/C flag of the coded block received at the point 406 is set to Continue, the receiver can recognize that a communication error has occurred.

Here, if the transmitter does not use the N/C flag, the receiver cannot recognize the fact that a communication error has occurred. Therefore, the receiver mistakes the coded block received at the point 406 for the initially transmitted coded block.

Referring to FIG. 4B, a transmitter transmits a coded block #1 with an N/C flag set to New over a channel #1 at a point 407. A receiver then receives the coded block #1 over the channel #1 at a point 408, and performs turbo decoding and CRC operation on the coded block #1 at a point 409, to determine whether an error has occurred in the coded block #1. As a result, if an error has occurred in the coded block #1, the receiver transmits NACK to the transmitter at the point 409. However, if an error occurs in the NACK due to a bad radio channel environment on a radio link, the transmitter may mistake the NACK transmitted by the receiver for ACK at the point 410. Upon receiving the ACK, the transmitter transmits a new coded block with an N/C flag set to New to the receiver over the channel #1 at a point 411. The receiver expects to receive a coded block #1 over the channel #1 at a point 412, after transmitting the NACK at the point 409. However, since an N/C flag of the coded block received from the transmitter at the point 412 is set New, the receiver can recognize that a communication error has occurred.

Likewise, if the transmitter does not use the N/C flag, the receiver cannot recognize the fact that a communication error has occurred. Therefore, the receiver mistakes the coded block received at the point 412 for the retransmitted coded block, and soft-combines the coded block received at the point 408 with the coded block received at the point 412. As a result, the soft-combining is performed between different coded blocks, causing another error.

Referring to FIG. 4C, occurrence of an error can be checked by analyzing continuity of channel numbers instead of the N/C flag. Specifically, a transmitter transmits coded blocks with sequential channel identifiers over four channels at a point 413, a point 415, a point 417 and a point 418. That is, the transmitter transmits a coded block with an N/C flag set to New over a channel #1 at the point 413. Similarly, the transmitter transmits coded blocks with an N/C flag set to New over a channel #2, a channel #3 and a channel #4 at the point 415, the point 417 and the point 418, respectively. A receiver then receives the coded blocks from the corresponding channels at a point 414, a point 416 and a point 419, and analyzes channel identifiers. However, since the coded block for the channel identifier #3 among the sequential channel identifiers is not received, the receiver can recognize that a communication error has occurred. In the description of FIGS. 4A to 4C, the transmitter is a Node B and the receiver is a UE.

For the communication errors described in conjunction with FIGS. 4A to 4C, the following error overcoming operations are generally performed.

First, if the communication error of FIG. 4A has occurred, i.e., if the transmitter determines that the receiver transmitted NACK although the receiver transmitted ACK, then the receiver discards the coded block received at the point 406 since the coded block received at the point 406 is identical to the coded block received at the point 402.

Second, if the communication error of FIG. 4B has occurred, i.e., if the transmitter determines that the receiver transmitted ACK although the receiver transmitted NACK, then the receiver stores the coded blocks received at the points 408 and 412 in the reception buffer 310 and transmits the stored coded block to the upper layer later on, since the coded block received at the point 412 is not identical to the coded block received at the point 408. As a result, a coded block buffered in the first HARQ channel buffer 340 associated with the channel #1, i.e., the coded block received at the point 408 will never be retransmitted, so the coded block can be discarded from the first HARQ channel buffer 340.

Alternatively, if searching an error overcoming process suitable to every circumstance inevitably increases system complexity, the receiver can be reset as soon as a communication error occurs.

As described above, when the n-channel SAW HARQ uses an N/C flag, the receiver can recognize occurrence of a communication error. However, when the N/C flag is used, physical bit resources for transmitting the N/C flag are required resulting in a reduction in system resources. In particular, if the asynchronous n-channel SAW HARQ is taken into consideration, the physical bit resources of (log 2(n)+1) bits should be additionally allocated for the channel numbers and the N/C flags, causing a further reduction in efficiency of the resources.

SUMMARY OF THE INVENTION

It is, therefore, an object of the present invention to provide a method for allocating an HARQ channel number for transmitting packet data using n-channel SAW HARQ in an HSDPA communication system.

It is another object of the present invention to provide a method for detecting a state and a channel number of a coded block received using n-channel SAW HARQ in an HSDPA communication system.

It is further another object of the present invention to provide a method for allocating a channel number for indicating a state of a coded block transmitted using n-channel SAW HARQ in an HSDPA communication system.

It is yet another object of the present invention to provide a method for detecting a communication error by allocating a channel number for indicating a state of a coded block transmitted using n-channel SAW HARQ in an HSDPA communication system.

To achieve the above and other objects, there is provided a method for allocating channel numbers to channel signals by a Node B, which repeatedly transmits a stream of n channel signals to a UE (User Equipment), each of the channel signals including a channel number and transmission data, the n channel signals having (n+1) different channel numbers, each channel having a given transmission time interval (TTI). The method comprises storing channel numbers of the n channel signals in a transmission window, and updating channel numbers such that n channel numbers are stored each time channel signals are transmitted; and allocating the same channel number as a channel number used for initial transmission to a channel signal to be transmitted if the channel signal to be transmitted is a retransmission channel signal, and allocating a channel number not belonging to the transmission window among the (n+1) channel numbers to a channel signal to be transmitted if the channel signal to be transmitted is an initial-transmission channel signal.

BRIEF DESCRIPTION OF THE DRAWINGS

The above and other objects, features and advantages of the present invention will become more apparent from the following detailed description when taken in conjunction with the accompanying drawings in which:

FIG. 9 illustrates an exemplary method of allocating HARQ channel numbers in the case where a communication error has occurred, according to an embodiment of the present invention.

DETAILED DESCRIPTION OF THE PREFERRED EMBODIMENT

Figure 1:
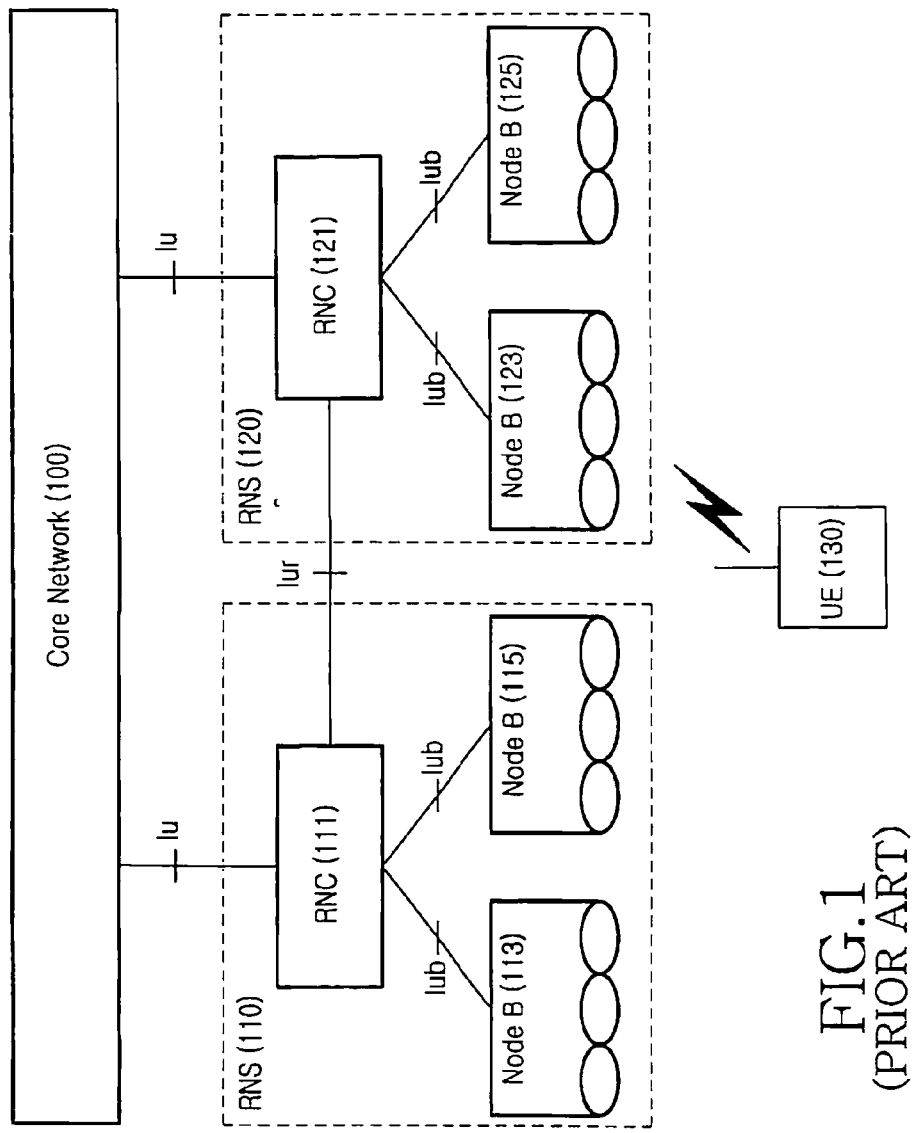
FIG. 1 schematically illustrates a structure of a general UMTS communication system.

A preferred embodiment of the present invention will be described herein below with reference to the accompanying drawings. In the following description, well-known functions or constructions are not described in detail since they would obscure the invention in unnecessary detail.

The asynchronous n-channel SAW HARQ (n-channel Stop And Wait Hybrid Automatic Retransmission Request) according to the present invention uses (n+1) HARQ channel identifiers. Therefore, using only the physical resources of ($\log_2$ n+1) bits, the present invention can detect a communication error like the n-channel SAW HARQ that uses an N/C (New/Continue) flag, i.e., the physical resources of ($\log_2$ n+1) bits.

First, a description will be made of a method of allocating a channel identifier to a coded block by a Node B using the n-channel SAW HARQ at a certain point.

When transmitting a coded block data using the n-channel SAW HARQ, the Node B defines a transmission window having a maximum of n elements. The number of elements belonging to the transmission window is defined as "transmission window size." The transmission window means a set of sequentially arranged HARQ channel numbers used at from a certain point to a previous $n^{th}$ point, and the transmission widow size is sequentially increased from 0 to n after call setup, and then fixed to n. In addition, the transmission window is updated at a point where the Node B has completely transmitted a certain coded block data.

The Node B applies the following rules in determining an HARQ channel number of a coded block to be transmitted.

First, if a coded block data to be transmitted is a new coded block data or a coded block data for initial transmission (hereinafter, referred to as initial-transmission coded block data), an HARQ channel number having the lowest frequency of use among HARQ channel numbers not belonging to the transmission window is allocated to the coded block data to be transmitted. If n different HARQ channel numbers exist in the transmission window, there remains only one HARQ channel number except the n HARQ channel numbers, so the remaining one HARQ channel number is allocated to the initial-transmission coded block data.

In addition, if there are a plurality of channel numbers having the same frequency of use, the smallest channel number among the plurality of the channel numbers is allocated as an HARQ channel number of the initial-transmission coded block.

Second, if a coded block to be transmitted is a coded block for retransmission (hereinafter, referred to as retransmission coded block), an HARQ channel number corresponding to the retransmission coded block is allocated to the coded block. That is, if the retransmission coded block is retransmitted for a coded block previously transmitted over an HARQ channel #1, the HARQ channel number #1 will be allocated to the retransmission coded block.

Meanwhile, the retransmission coded block has a valid retransmission period, and the retransmission must be performed within the valid retransmission period.

If a Node B allocates HS-DSCH (High-Speed Downlink Shared Channel) transmission resources to different UEs (User Equipments) and a valid retransmission period for a coded block retransmitted in a state where a specific UE is call-dropped, has expired, then the retransmission coded block is first transmitted at a point where a call with the specific UE is resumed. If there are a plurality of coded blocks to be retransmitted (or retransmission coded block), the Node B transmits the retransmission coded blocks in accordance with the order of initially transmitted coded blocks.

That is, the Node B first transmits the retransmission coded block. To be specific, if the Node B has completely prepared to perform retransmission on coded blocks at a certain point, it should first transmit the retransmission coded block for the next TTI (Transmission Time Interval).

A process of allocating an HARQ channel number to a coded block to be transmitted by a Node B will be described with reference to FIG. 5.

Figure 5:
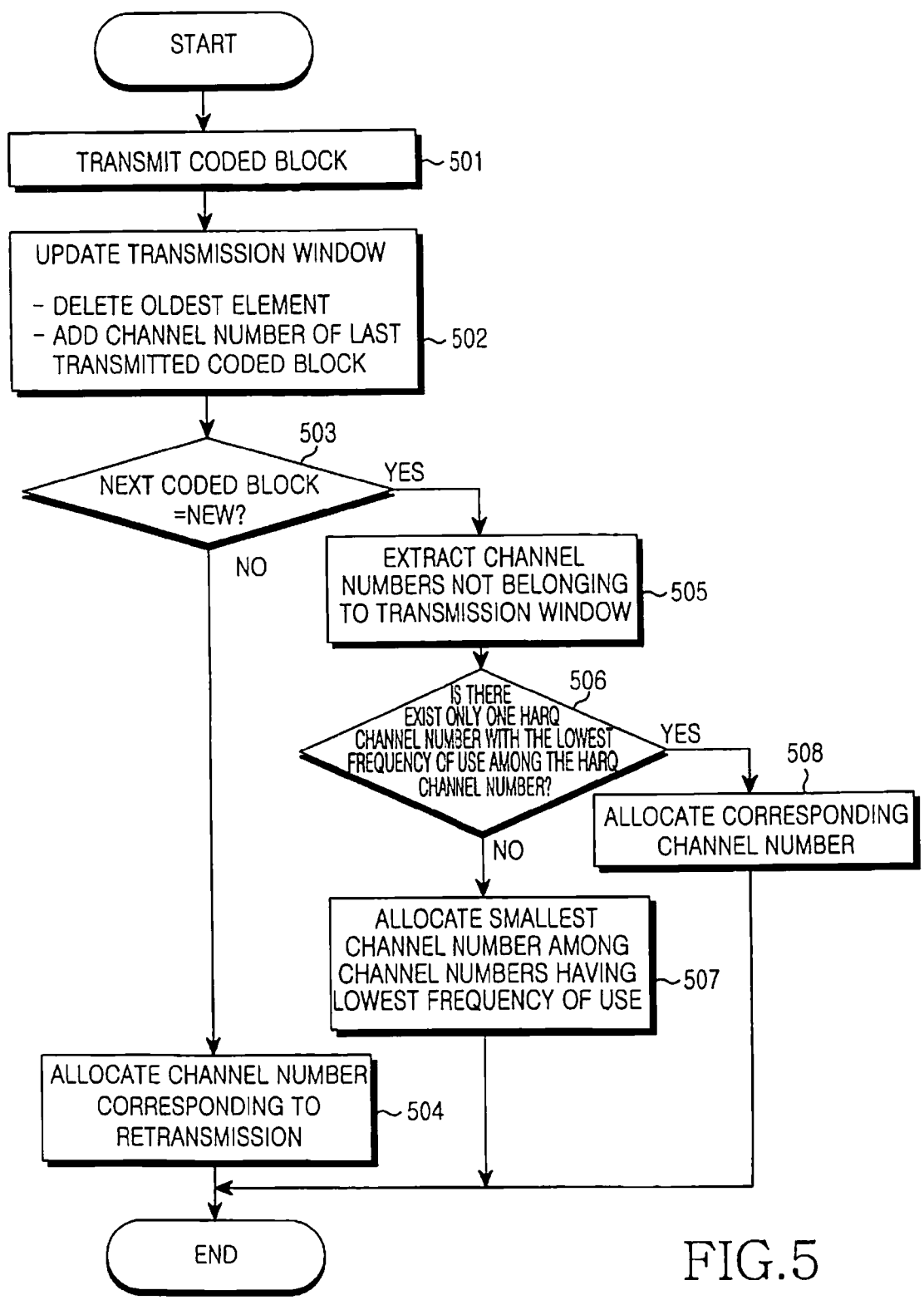
FIG. 5 illustrates a process of allocating an HARQ channel number during transmission of a coded block by a Node B according to an embodiment of the present invention.

FIG. 5 illustrates a process of allocating an HARQ channel number during transmission of a coded block by a Node B according to an embodiment of the present invention.

Figure 2:
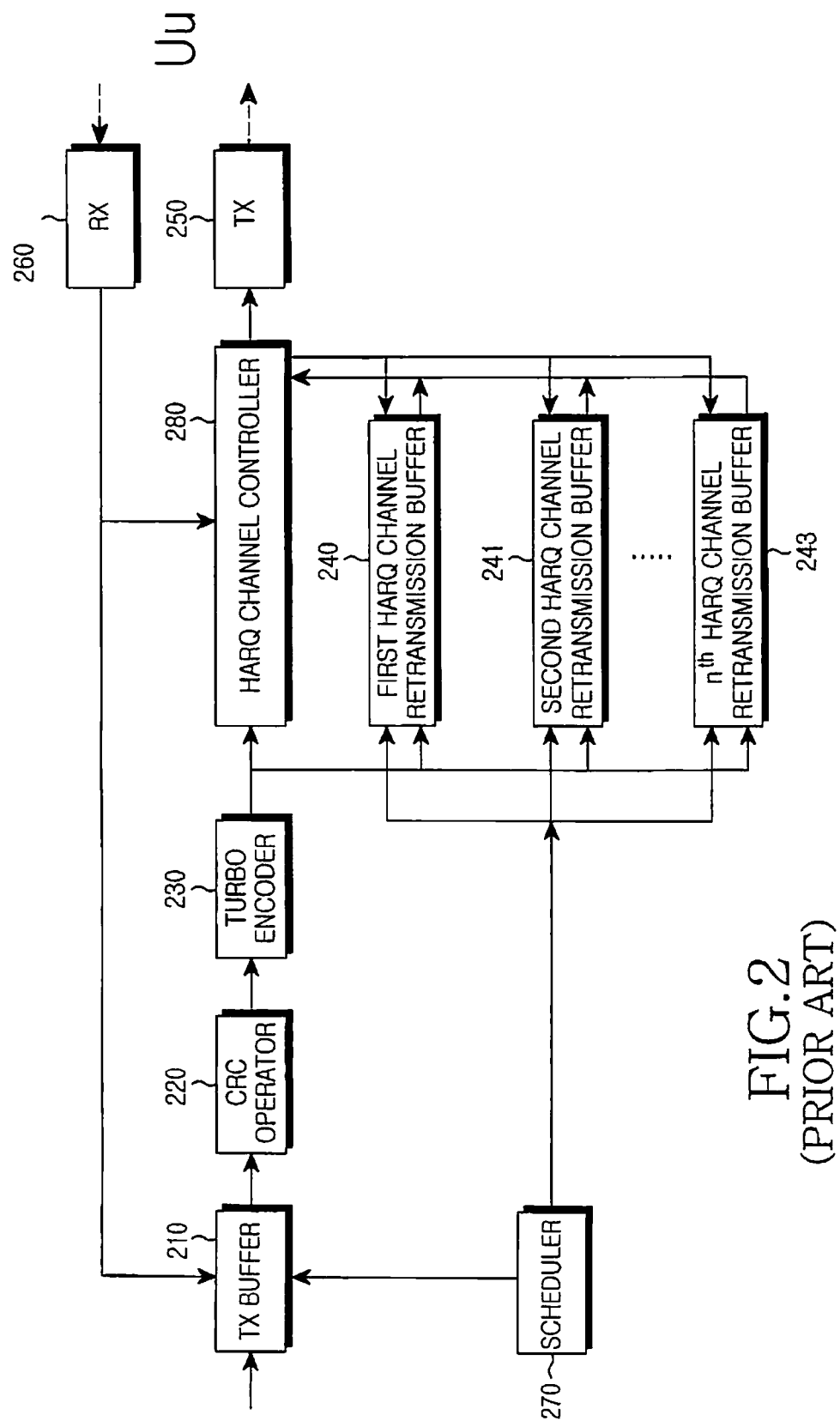
FIG. 2 is a block diagram illustrating a structure of a general transmitter supporting the n-channel SAW HARQ.
Figure 3:
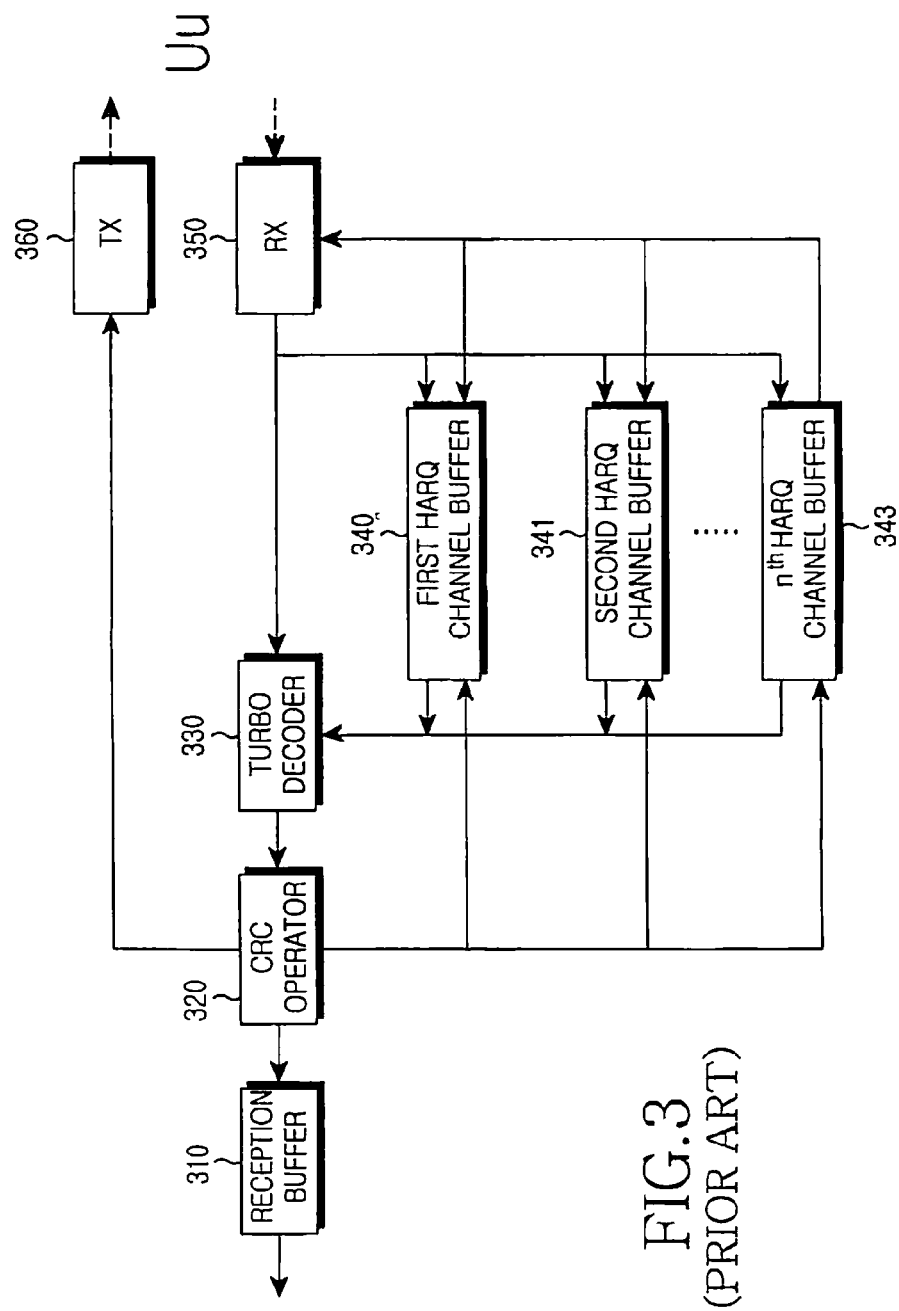
FIG. 3 illustrates a structure of a general receiver supporting the n-channel SAW HARQ.

Before a description of FIG. 5, it will be assumed that a transmitter such as a Node B and a receiver such as a UE have the same hardware structures as those illustrated in FIGS. 2 and 3, respectively. However, in the structure of the Node B, an operation of allocating HARQ channel numbers to coded blocks to be transmitted by the HARQ channel controller 280 is different. Further, in the structure of the UE, a process of receiving a coded block and determining a state of the received coded block is different.

Referring to FIG. 5, if there is a coded block to be transmitted, the Node B allocates an HARQ channel number to the coded block data to be transmitted and transmits the coded block data over an HARQ channel corresponding to the allocated HARQ channel number, in step 501, and then proceeds to step 502. At first, there exists no HARQ channel number in a transmission window, so the Node B allocates the smallest HARQ channel number among (n+1) HARQ channel numbers to the coded block data. Of course, if it is not an initial transmission of a coded block data, a maximum of n HARQ channel numbers exist in the transmission window. In step 502, the Node B updates the transmission window after completion of transmitting the coded block data, and then proceeds to step 503. In the transmission window updating process, the Node B deletes the oldest HARQ channel number of the transmission window, i.e., deletes the first allocated HARQ channel number among the HARQ channel numbers existing in the transmission window, and adds the HARQ channel number allocated to the transmitted coded block data. In step 503, the Node B determines whether a coded block data to be transmitted for the next TTI is an initial-transmission coded block data (or new coded block). Whether a coded block data to be transmitted for the next TTI is a new coded block is determined by determining whether a coded block data to be transmitted for the next TTI is a coded block data received from an HARQ channel retransmission buffer or a coded block received from a turbo encoder. If a coded block data to be transmitted for the next TTI is a coded block data received from the HARQ channel retransmission buffer, it is determined that the coded block data is a retransmission coded block data. If a coded block data to be transmitted for the next TTI is a coded block data received from the turbo encoder, it is determined that the coded block data is an initial-transmission coded block data. As a result of the determination, if a coded block data to be transmitted for the next TTI is not an initial-transmission coded block data but a retransmission coded block data, the Node B proceeds to step 504. In step 504, the Node B allocates an HARQ channel number corresponding to the retransmission coded block data. Here, the "HARQ channel number corresponding to the retransmission coded block data" means an HARQ channel number, which was allocated to transmit the initial-transmission coded block, for the retransmission coded block data. For example, if an error occurs in an initially transmitted coded block data allocated an HARQ channel number #x and thus the coded block data must be retransmitted, the coded block data is retransmitted through the HARQ channel number #x.

However, if a coded block data to be transmitted for the next TTI is an initial-transmission coded block data in step 503, the Node B proceeds to step 505. In step 505, the Node B detects HARQ channel numbers not belonging to the current transmission window, and then proceeds to step 506. In step 506, the Node B determines whether there exists only one HARQ channel number with the lowest frequency of use among the detected HARQ channel numbers not belonging to the transmission window. If there does not exist only one HARQ channel number with the lowest frequency of use among the HARQ channel numbers not belonging to the transmission window, i.e., if there exist a plurality of HARQ channel numbers with the lowest use frequency, the Node B proceeds to step 507. In step 507, the Node B selects the smallest HARQ channel number among the HARQ channel numbers with the lowest use frequency, allocates the selected HARQ channel number to a coded block data to be transmitted for the next TTI, and transmits an initial-transmission coded block data to a UE for the next TTI over an HARQ channel corresponding to the allocated HARQ channel number.

Otherwise, if it is determined in step 506 that there exists only one HARQ channel number with the lowest frequency of use among the detected HARQ channel numbers not belonging to the transmission window, the Node B proceeds to step 508. In step 508, the Node B allocates the HARQ channel number with the lowest use frequency to a coded block data to be transmitted for the next TTI, and transmits an initial-transmission coded block data to the UE for the next TTI over an HARQ channel corresponding to the allocated HARQ channel number.

Next, a description will be made of a process of receiving a coded block data transmitted by the Node B using the n-channel SAW HARQ, and analyzing a channel identifier or an HARQ channel number allocated to the coded block data to determine a state of the corresponding coded block data, i.e., determines whether the corresponding coded block data is an initially transmitted coded block data or a retransmitted coded block data. The process is performed by the UE.

First, the UE defines a reception window having a maximum of n elements having (n+1) channel numbers about n HARQ channel, as the Node B transmits coded block data using the n-channel SAW HARQ. Further, the number of elements belonging to the reception window is defined as "reception window size."

The reception window means a set of sequentially arranged HARQ channel numbers received from a certain point to a previous $n^{th}$ point. The reception widow size is sequentially increased from 0 to n after call setup, and then fixed to n. In addition, the reception window is updated at a point where the UE has completely received a certain coded block data.

In addition, if the Node B transmits coded block data using the n-channel SAW HARQ, the UE defines a retransmission window comprised of HARQ channel numbers corresponding to defective coded block data among the received coded block data, i.e., corresponding to the coded block data over which the UE transmitted NACK to the Node B due to an error occurred in the received coded block data.

Since the retransmission window is comprised of the HARQ channel numbers corresponding to the coded block data over which NACK was transmitted, i.e., corresponding to the defective coded block data, it can theoretically include a maximum n elements having (n+1) HARQ channel numbers about n HARQ channel. However, HARQ channel numbers corresponding to the defective coded block data with a valid retransmission period expired are deleted from the retransmission window at a point where the valid retransmission period expires. Further, addition of a HARQ channel number to the retransmission window is performed at a point where transmission of NACK for the corresponding coded block is completed.

Meanwhile, deletion of an HARQ channel number stored in the retransmission window is performed at a point where the valid retransmission period expires. If the valid retransmission period has not expire yet, the deletion is performed when a coded block data having the same HARQ channel number as the corresponding HARQ channel number in the retransmission window is received within the valid retransmission period.

If an HARQ channel number of a coded block data received at a certain point is identical to a "next retransmission HARQ channel number" or a "next initial-transmission HARQ channel number," the UE determines that no communication error has occurred at the corresponding point.

Here, the next retransmission HARQ channel number means an HARQ channel number first and foremost updated in the retransmission window at a certain point. In addition, the next initial-transmission HARQ channel number means an HARQ channel number having the lowest use frequency and the smallest channel number among the HARQ channel numbers not belonging to the reception window. A process of determining the next initial-transmission HARQ channel number is identical to the above-described process of determining the HARQ channel number to be allocated to the coded block data initially transmitted by the Node B, so a detailed description thereof will not be provided.

Meanwhile, if an HARQ channel number of a coded block data received at a certain point is identical to a next retransmission HARQ channel number, the UE determines that the corresponding coded block data is a retransmitted coded block data. However, if an HARQ channel number of a coded block data received at a certain point is identical to a next initial-transmission HARQ channel number, the UE determines that the corresponding coded block is an initially transmitted coded block data.

In an interval where a valid retransmission period for a next retransmission HARQ channel number has expired, i.e., after a lapse of a valid retransmission period for a coded block data received through a specific HARQ channel number, the UE determines that a communication error has occurred before a coded block data having an HARQ channel number identical to a corresponding next retransmission HARQ channel number is received. The valid retransmission period-expired interval will be described later on.

Next, a process of updating a reception window and a retransmission window by a UE will be described with reference to FIG. 6.

Figure 6:
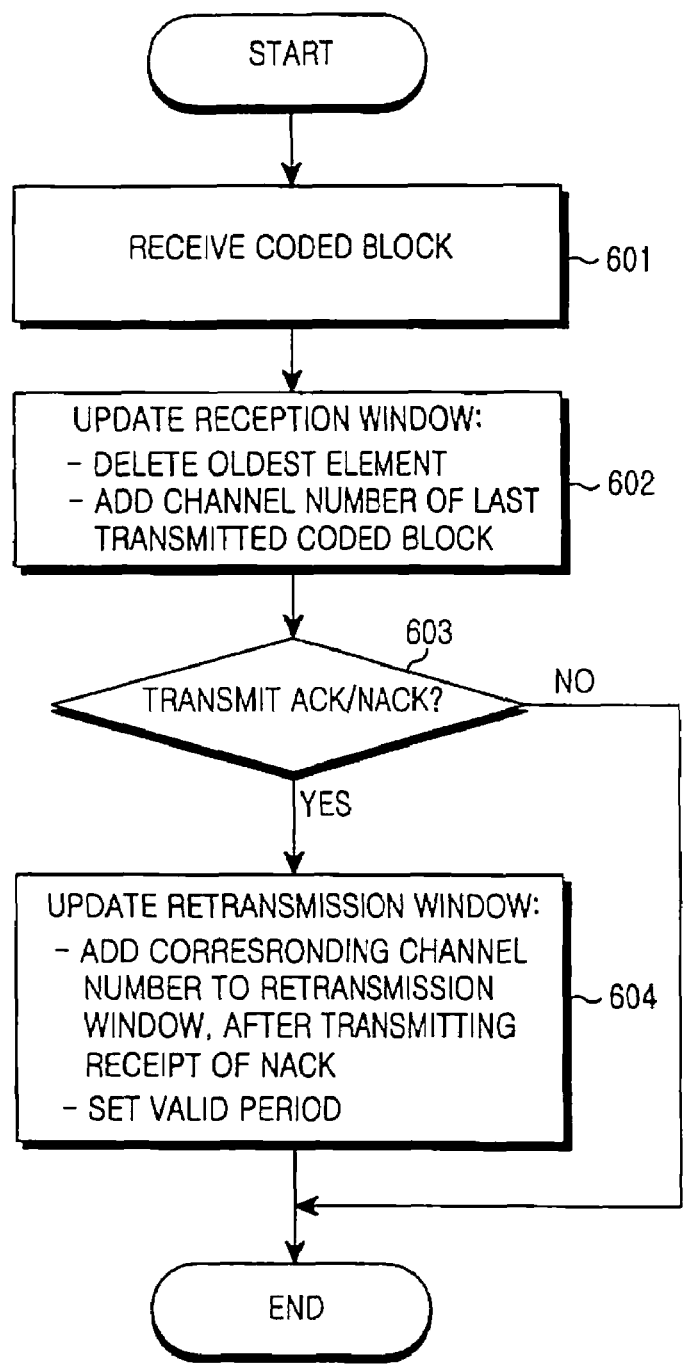
FIG. 6 illustrates a process of updating a reception window and a retransmission window by a UE according to an embodiment of the present invention.

FIG. 6 illustrates a process of updating a reception window and a retransmission window by a UE according to an embodiment of the present invention. Referring to FIG. 6, the UE receives a coded block data transmitted by the Node B in step 601, and then proceeds to step 602. In step 602, the UE updates a reception window, as reception of the coded block data from the Node B is completed, and then proceeds to step 603. The reception window is updated by deleting the oldest channel number from the reception window and adding an HARQ channel number of the coded block data received in step 601 as a new element. For example, in a system using 5-channel SAW HARQ, the UE having a reception windowsize is 5 and the reception window can have HARQ channel numbers [a, b, c, d, e, f]. The current reception window can have HARQ channel numbers [a, b, c, d, e]. In the reception window, the rightmost element is an HARQ channel number for the last received coded block data, and the leftmost element is an HARQ channel number for the oldest received coded block data. When the UE has received a coded block data with an HARQ channel number #f at a certain point, the UE updates the reception window by deleting the oldest channel number "a" from the reception window, and inserting HARQ channel number "f" in the rightmost position. As a result, the reception window is updated to [b, c, d, e, f]. In step 603, the UE performs a CRC operation on the received coded block data, and then determines whether the CRC operation result represents NACK. If the CRC operation result does not indicate NACK, i.e., indicates ACK, the UE transmits ACK to the Node B and then ends the process. However, if the CRC operation result indicates NACK, the UE proceeds to step 604. In step 604, the UE adds an HARQ channel number of the received coded block data to the retransmission window, and sets a valid retransmission period. Here, a process of deleting an HARQ channel number with an expired valid retransmission period from the retransmission window is not illustrated in FIG. 6. The reason is because expiration of the valid retransmission period is irrelevant to reception of a coded block data or transmission of ACK/NACK.

Next, a method of detecting a communication error by a UE will be described with reference to FIG. 7.

Figure 7:
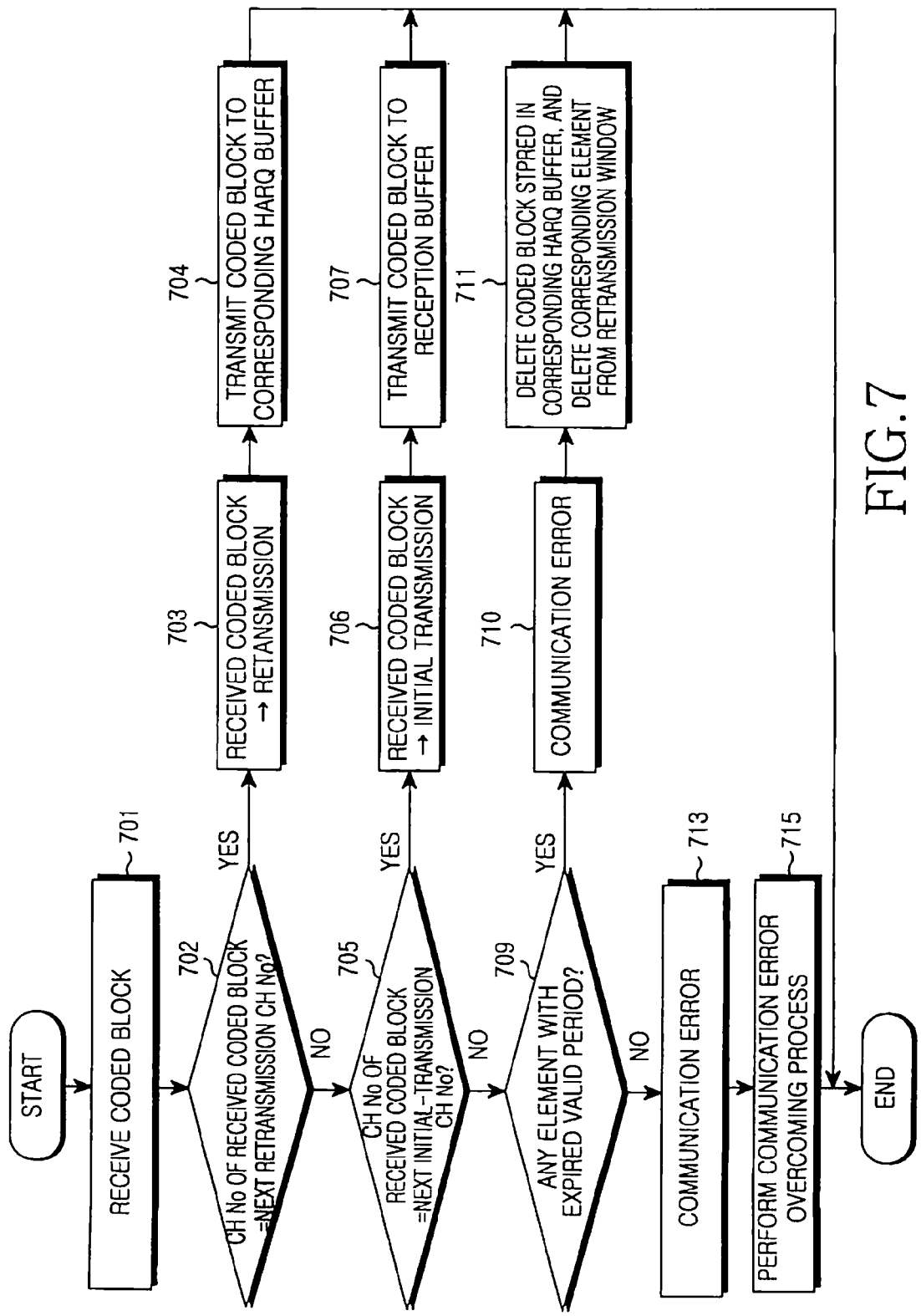
FIG. 7 illustrates a process of detecting a communication error using HARQ channel numbers of received coded blocks by a UE according to an embodiment of the present invention.

FIG. 7 illustrates a process of detecting a communication error using HARQ channel numbers of received coded block data by a UE according to an embodiment of the present invention. Referring to FIG. 7, the UE receives a coded block data transmitted by the Node B in step 701, and then proceeds to step 702. Upon receiving the coded block, the UE identifies an HARQ channel number of the received coded block data as described in conjunction with FIG. 6, and then determines in step 702 whether an HARQ channel number of the received coded block data is identical to a next retransmission HARQ channel number. If the HARQ channel number of the received coded block data is identical to a next retransmission HARQ channel number, the UE proceeds to step 703. In step 703, the UE determines that the received coded block data is a retransmitted coded block data, and then proceeds to step 704. In step 704, the UE delivers the received coded block data to a corresponding HARQ channel buffer as described in conjunction with FIG. 3, to soft-combine the received coded block with a previously buffered coded block, and then ends the process. However, if it is determined in step 702 that an HARQ channel number of the received coded block is not identical to a next retransmission HARQ channel number in the retransmission window, the UE proceeds to step 705. In step 705, the UE determines whether an HARQ channel number of the received coded block data is identical to a next initial-transmitted HARQ channel number. If an HARQ channel number of the received coded block data is identical to a next initial-transmitted HARQ channel number, the UE proceeds to step 706. In step 706, the UE determines that the received coded block data is an initially transmitted coded block data, and then proceeds to step 707. In step 707, the UE delivers the received coded block to the reception buffer 310 as described in conjunction with FIG. 3, to transmit the received coded block data to an upper layer. Of course, the UE receives a coded block data in steps 702 and 705 on the assumption that no communication error occurs.

However, if it is determined in step 705 that an HARQ channel number of the received coded block is not identical to a next initial-transmission HARQ channel number, the UE proceeds to step 709. In step 709, the UE determines whether there exists an element with an expired valid transmission period among the elements of the retransmission window. If there exists an element with an expired valid transmission period among the elements of the retransmission window, the UE proceeds to step 710. In step 710, the UE determines that a communication error has occurred, and then proceeds to step 711. In step 711, the UE deletes a coded block buffered in a HARQ channel buffer corresponding to the HARQ channel number of the received coded block data, and deletes a corresponding HARQ channel number from the retransmission window, and then ends the process. Here, that an HARQ channel number is deleted from the retransmission window due to expiration of its valid retransmission period means that a retransmitted part to be soft-combined with the coded block buffered in the corresponding HARQ channel buffer is not received within the valid retransmission period. This phenomenon may occur when the Node B mistakes NACK transmitted by the UE for ACK as described in conjunction with FIG. 4B. In this case, since the Node B has already deleted the corresponding coded block data from the corresponding HARQ channel retransmission buffer, the Node B cannot retransmit the corresponding coded block data. Therefore, the UE cannot perform soft combining on the received coded block data. As a result, the UE discards the corresponding coded block data from the corresponding HARQ channel buffer.

If it is determined in step 709 that there exists no HARQ channel number with an expired valid transmission period among the channel numbers of the retransmission window, the UE proceeds to step 713. In step 713, the UE determines that a communication error has occurred in the received coded block, and then proceeds to step 715.

Figure 4A:
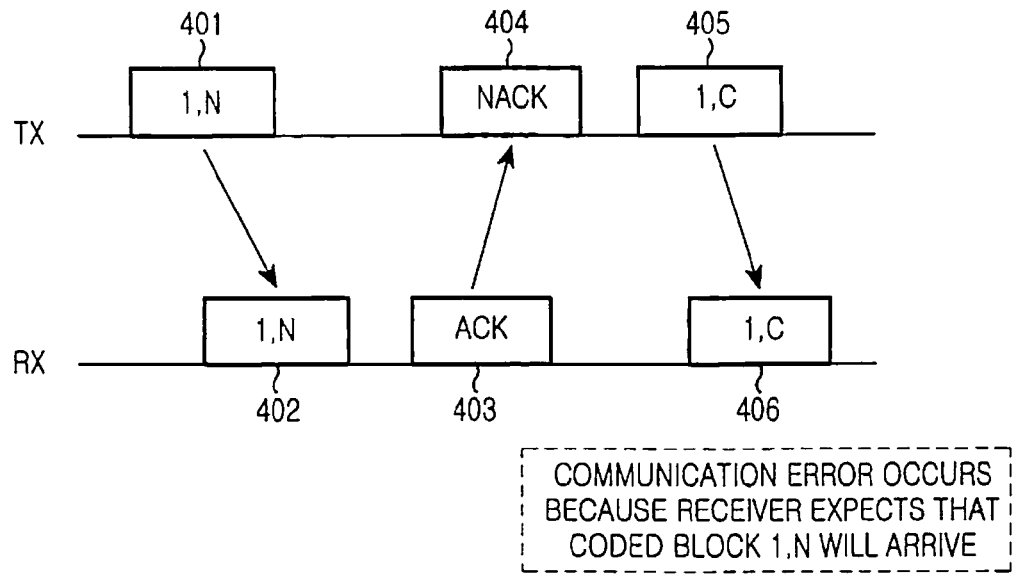
FIG. 4A illustrates a communication error occurring when a Node B supporting the HARQ mistakes ACK from a UE for NACK in an HSDPA communication system.
Figure 4B:
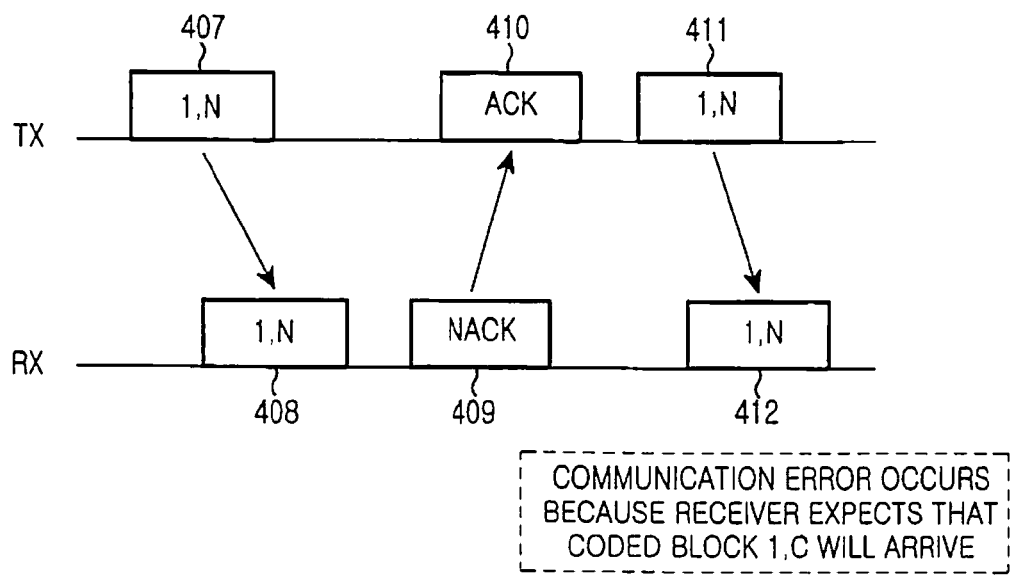
FIG. 4B illustrates a communication error occurring when a Node B supporting the HARQ mistakes NACK from a UE for ACK in an HSDPA communication system.
Figure 4C:
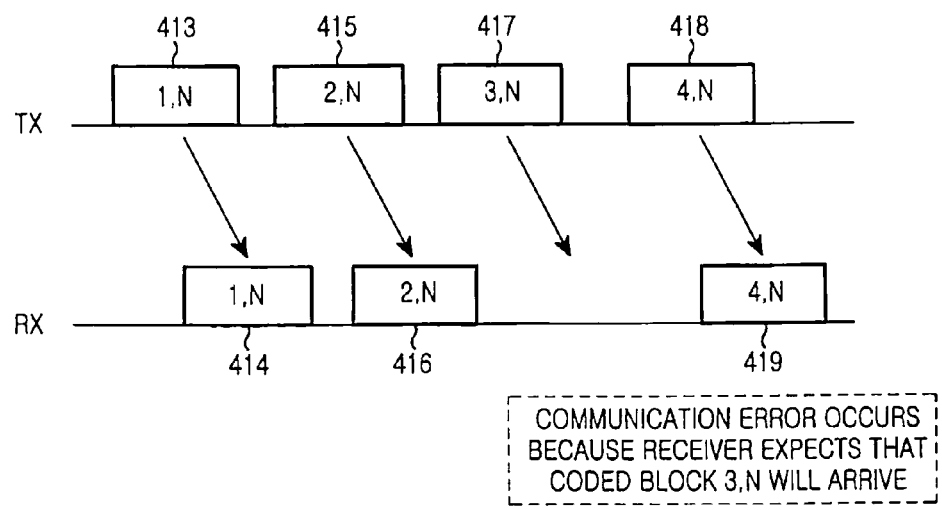
FIG. 4C illustrates a communication error occurring when a Node B supporting the HARQ fails to receive a coded block in an HSDPA communication system.

Here, the communication error of step 713 may occur when although a UE transmitted ACK upon receipt of a coded block data A, a Node B mistakes the ACK for NACK as described in conjunction with FIG. 4A. In step 715, the UE performs a communication error overcoming process, as the communication error is detected. For example, the UE performs a communication error overcoming process of discarding the repeatedly transmitted coded block. That is, since the UE has already processed the coded block data A, it is preferable to discard the newly transmitted coded block data A. Alternatively, the communication error of step 713 may occur when there is a gap between HARQ channel numbers in the reception buffer since a UE fails to receive a coded block data, as described in conjunction with FIG. 4C. In this case, the UE may simply recognize occurrence of a communication error in step 715, and then normally operate. In this case, the UE cannot cope with the communication error. That is, since the UE cannot send a retransmission request for the reception-failed coded block, it is preferably to normally process the received coded block regardless of a communication error.

As described above, the communication error occurring when the Node B mistakes ACK transmitted by the UE for NACK, can be detected through the retransmission window and the reception window. If an HARQ channel number (hereinafter, referred to as a "reception HARQ channel number") of a coded block received at a certain point does not belong to the retransmission window but TTI of the reception point is identical to a quasi valid period-expired interval of the HARQ channel, it can be considered that a communication error has occurred. In this case, the received coded block data is discarded without being processed. Here, the quasi valid period-expired interval will be described later on.

Next, reference will be made to a valid retransmission period used for a retransmission coded block by the Node B and the UE. A valid retransmission period for an arbitrary retransmission coded block data refers to a critical time point where the Node B can retransmit a corresponding coded block data, and a critical time point where the UE expects that a retransmitted part of the corresponding coded block data will arrive. That is, if a valid retransmission period for an arbitrary retransmission coded block data is set to "x," a Node B must complete retransmission of the corresponding coded block data at from an initial transmission point $t(0)$ to a point $t(0+x)$, and a UE expects that the corresponding coded block will arrive at from an initial reception point $t(1)$ to a point $t(1+x)$. In other words, the UE recognizes a coded block data having the same HARQ channel number as a coded block data initially received at between $t(1)$ and $t(1+x)$ as retransmission of the corresponding coded block data.

The valid retransmission period is not a value calculated by an absolute criterion, and is set to a proper value considering capability and buffer capacity of the UE and the Node B performing HSDPA communication. If the valid retransmission period is set to an excessively short value, the valid retransmission period may expire before the Node B prepares retransmission, due to a scheduling problem of other coded block data. In contrast, if the valid retransmission period is set to an excessively long value, it is not possible to properly cope with a communication error. In addition, the valid retransmission period-expired interval means a TTI where the valid retransmission period expires. For example, if a valid retransmission period has x TTIs, the valid retransmission period-expired interval means a TTI that is received after x TTIs from the TTI where the initial-transmission coded block is transmitted, i.e., means an $(x+1)^{th}$ TTI.

As mentioned above, the valid retransmission period does not have a universal value that can be applied to all communication situations. However, if the Node B grants priority to retransmission against initial transmission, each call can have a specified value. That is, if priority is given to retransmission against initial transmission, the Node B initiates retransmission as soon as it prepares retransmission on an arbitrary coded block data, since a time needed to prepare for retransmission is fixed unless a call drop occurs. Here, the "call drop" means a situation where an arbitrary UE is successively diminished (or disconnected) while a plurality of UEs share HS-DSCH. That is, the time required to prepare for retransmission is calculated by the sum of (i) a time required in transmitting a coded block data, (ii) a time required in processing the corresponding coded block data by the UE, (iii) a time required in transmitting feedback information (FBI), and (iv) a time required in preparing for retransmission by the Node B, on the basis of a time point where the corresponding coded block data is transmitted. The time required to prepare for retransmission is closely related to a value determined by multiplying the number n of channels by TTI in a system employing the n-channel SAW HARQ. That is, in the n-channel SAW HARQ, the value n TTI must be larger than the time required to prepare for retransmission. Therefore, when the n-channel SAW HARQ is used, the present invention sets the valid retransmission period to n TTIs. In this case, advantageously, the Node B and the UE can use a common valid retransmission period without a separate mutual agreement on the valid retransmission period. Further, the TTI is a time unit, a basic unit of transmitting/receiving a coded block and transmitting/receiving corresponding ACK/NACK information in the HSDPA communication system. Next, a description will be made of exceptive rules applied when setting a valid retransmission period to n TTIs and deleting elements with the expired valid retransmission period from the retransmission window in the communication system using the n-channel SAW HARQ.

(1) First Exceptional Regulation: If a valid retransmission period for a retransmission coded block data has expired in a situation where a call to a certain UE has been dropped since a Node B allocates HS-DSCH transmission resources to other UEs, the valid retransmission period shall be extended until a call to the corresponding UE is resumed. Under First Exception Regulation, if n channel numbers exist in the retransmission window, valid retransmission periods of the respective channel numbers are extended by 1 TTI, 2 TTIs, . . . , n TTIs from a call resumption point in accordance with the order of additions to the retransmission window.

(2) Second Exceptional Regulation: If a call drop occurs again in the above state, First Exceptional Regulation shall be applied when a call is resumed later on, considering that valid retransmission periods of the HARQ channel numbers remaining in the retransmission window in the call dropped state have expired again. The reason for applying First Exceptional Regulation and Second Exceptional Regulation is to cope with a call drop situation occurring due to sharing of transmission resources by several UEs, since the several UEs share the transmission resources in receiving HSDPA service data in the HSDPA communication system. In addition to First Exceptional Regulation and Second Exceptional Regulation, the following regulation can also be applied.

(3) Third Exceptional Regulation: If a call drop occurs, expiration of the valid retransmission period shall be extended by the call drop duration.

Although any of First to Third Exceptional Regulations is applied, initial transmission and retransmission according to the present invention will be normally performed. However, when First Exceptional Regulation is applied, the retransmission can be performed more rapidly.

Next, an exemplary method of allocating HARQ channel numbers in the case where no communication error has occurred will be described with reference to FIG. 8.

Figure 8:
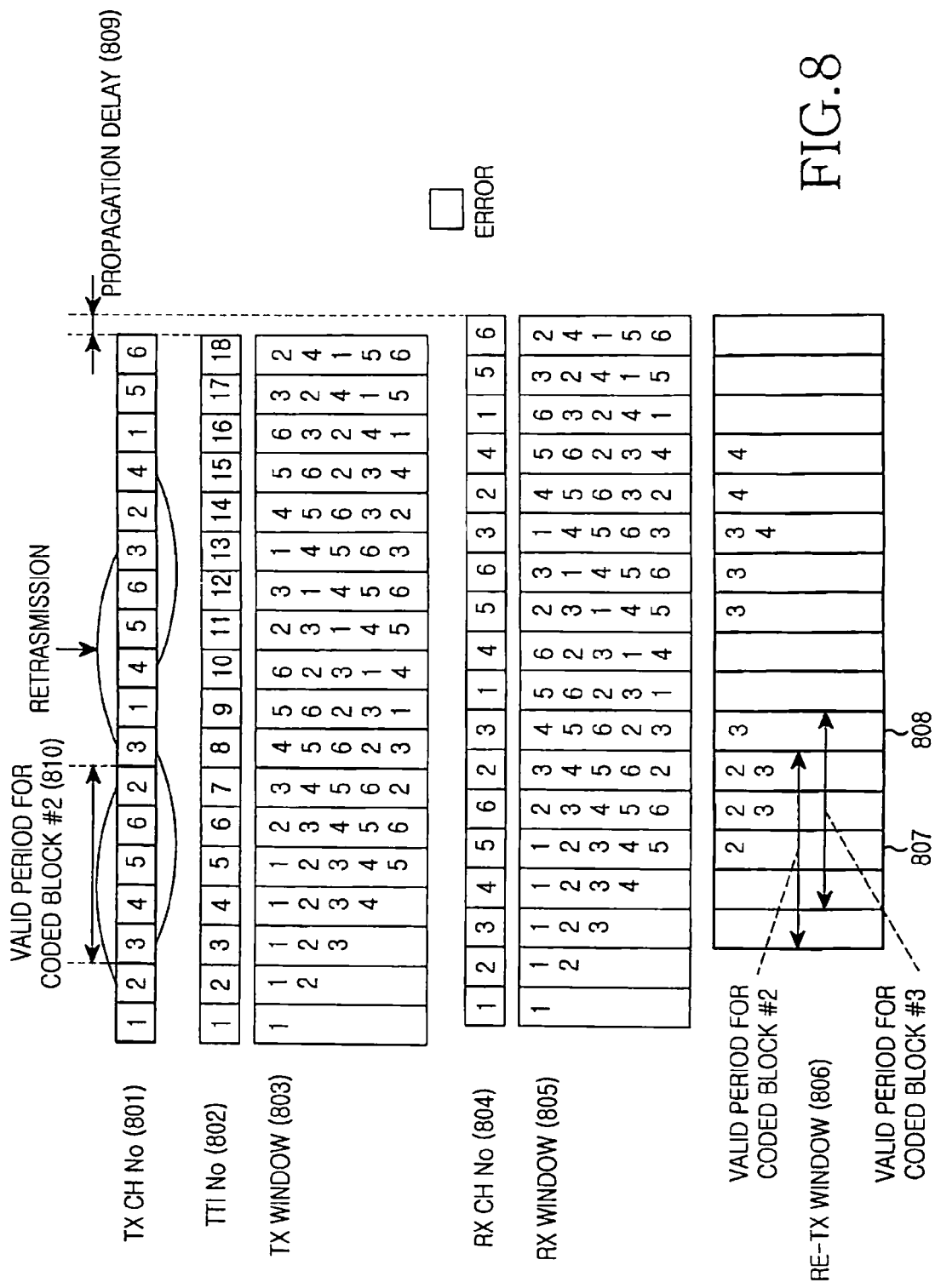
FIG. 8 illustrates an exemplary method of allocating HARQ channel numbers in the case where no communication error has occurred, according to an embodiment of the present invention.

FIG. 8 illustrates an exemplary method of allocating HARQ channel numbers in the case where no communication error has occurred, according to an embodiment of the present invention. Referring to FIG. 8, it will be assumed that the HSDPA communication system uses a 5-channel SAW HARQ technique. When transmission channel numbers 801 indicate the passage of time from the left to the right, i.e., when the transmission channel numbers 801 are defined as a time axis, the transmission channel numbers 801 represent HARQ channel numbers allocated to coded block data transmitted for each TTI by a Node B. That is, from the viewpoint of the axis of the transmission channel numbers 801, the Node B has transmitted a coded block data over an HARQ channel #1 at first, and then sequentially transmitted coded block data over HARQ channels #2, #3, #5, #6, #2, and #3. Further, since a valid retransmission period is 5 TTIs as stated above, if an error occurs in the coded block data transmitted over the HARQ channel #2, a retransmitted part for the coded block data transmitted over the HARQ channel #2 should be received within a next 5-TTI period 810.

In addition, for the sake of convenience, TTI numbers 802 are assigned to respective TTIs in the order of the passage of time. As illustrated in FIG. 8, a number of a first transmitted TTI is defined as TTI #1, and in this manner, the TTI numbers 802 are sequentially assigned with the passage of time. A transmission window 803 shows the HARQ channel numbers of the transmission window updated for each TTI. HARQ channel numbers in the transmission window are updated at a point where transmission of a corresponding coded block data is completed. For example, in the case of TTI #1, an element #1 is added to the transmission window at a point where transmission of a coded block data #1 is completed. For the sake of convenience, a coded block data transmitted over an HARQ channel #n will be referred to as a "coded block #n." Reception channel numbers 804 represent HARQ channel numbers of coded block data received by a UE for each TTI. A reception window 805 shows the HARQ channel numbers of the reception window updated for each TTI. HARQ channel numbers in the reception window 805 are updated at a point where reception of a corresponding coded block data is completed. Therefore, unless an error occurs in the HARQ channel numbers, the transmission window 803 is constantly synchronized with the reception window 805 while maintaining a propagation delay 809. A retransmission window 806 is updated after the UE finishes transmission of NACK. In FIG. 8, it is assumed that the UE finishes transmission of NACK, 3 TTIs after it completes reception of a coded block data. As illustrated in FIG. 8, since the UE transmits NACK signal, 3 TTIs after it received a coded block #2 for a TTI #2, the UE adds an HARQ channel number for the coded block #2 to the retransmission window 806 for a TTI #5. As stated above, it is assumed that the UE finishes transmission of NACK, 3 TTIs after it completes reception of a coded block data. The UE receives coded block data of channel number #2 in the TTI #2, but that is error. The UE transmits NACK signal after 3 TTI (that is, TTI #5). Further, it is assumed in FIG. 8 that retransmissions have occurred at the dotted TTI numbers TTI #2, TTI #3, TTI #8 and TTI #10.

Now, an operation of a Node B and a UE will be described with reference to FIGS. 5, 6 and 8. In describing the operation of a Node B and a UE, the TTI numbers 802 will be used as a time reference. Although the TTI numbers 802 are shown from the viewpoint of only the Node B in FIG. 8, it will be assumed that the same TTI numbers exist even in the UE while maintaining the propagation delay 809. That is, from the viewpoint of the UE, TTI #1 means an interval having the same size as the TTI #1 of FIG. 8 while maintaining the propagation delay 809.

First, the Node B allocates an HARQ channel number #1 to a coded block data #1 in step 501 of FIG. 5, and then updates the transmission window by adding the HARQ channel number #1 to the transmission window in step 502 (TTI #1). Thereafter, if a coded block data to be transmitted for the next TTI is an initial-transmission coded block data (or new coded block data ) in step 503, the Node B determines an HARQ channel number to be allocated to the initial-transmission coded block data. Here, in the process of determining the HARQ channel number, since only an HARQ channel number #1 exists in the transmission window at a point where a coded block data #2 is transmitted, available HARQ channel numbers extracted on the above assumption are 2 to 6. If the HARQ channel numbers are extracted, the Node B determines in step 506 whether there exists only one HARQ channel number with the lowest frequency of use among the extracted HARQ channel numbers. Since all the channel numbers #2 to #6 available on the above assumption have the use frequency of 0, the Node B allocates the smallest HARQ channel number #2 among the HARQ channel numbers with the lowest use frequency to a coded block data to be transmitted for the next TTI. The Node B transmits the coded block data allocated the HARQ channel number #2, and then updates the transmission window by adding the HARQ channel number #2 to the transmission window.

In the same manner, the Node B allocates HARQ channel numbers #3, #4 and #5 to coded blocks #3, #4 and #5, respectively (TTI #3, TTI #4 and TTI #5).

Meanwhile, after transmitting a coded block data over HS-DSCH, the Node B receives ACK/NACK signal feedback information for the transmitted coded block data from the UE. If the received feedback information is NACK signal, the Node B prepares for retransmission on the coded block data corresponding to the NACK signal. As described above, the Node B performs retransmission on the defective coded block data within 5 TTIs or a valid retransmission period. That is, as illustrated in FIG. 8, since an error occurs in a coded block data #2 transmitted by the Node B for TTI #2, the coded block data #2 must be retransmitted within TTI #7 where its valid retransmission period expires. As described above, the valid retransmission period and the channel period are set to the same value, because retransmission on a coded block data is performed, n TTIs after an error is detected from the corresponding coded block data in the n-channel SAW HARQ. Therefore, for the TTI #7, the Node B performs retransmission on the coded block #2 and updates the transmission window to [3,4,5,6,2].

Now, a description will be made of a time point where the Node B performs retransmission on an arbitrary coded block data. A time required between a point where an arbitrary coded block data is transmitted and a point where preparation for retransmission on the coded block data is completed, includes:

1) a time required in transmitting an arbitrary coded block data by the Node B, 2) a time required in receiving the coded block data and processing the received coded block data by the UE, 3) a time required in transmitting feedback information such as ACK/NACK signal by the UE, and 4) a time required in preparing for retransmission by the Node B.

In the n-channel SAW HARQ, the number n of channels is set such that n×TTI should be larger than the sum of the above-stated times. In other words, n TTIs after an arbitrary coded block data was transmitted, preparation for retransmission on the corresponding coded block data is always completed. In some cases, the retransmission may be performed earlier than this. That is, although it is assumed in this embodiment that retransmission on the coded block #2 is performed for the TTI #7, the retransmission may be performed earlier than this. For example, preparation for retransmission on the coded block data #2 is completed for TTI #6, so the Node B performs the retransmission for the TTI #6. Of course, the present invention can be applied even when the retransmission is performed much earlier than the valid retransmission period-expired point.

Thereafter, for TTI #8, the Node B performs retransmission on a coded block data #3 and updates the transmission window to [4,5,6,2,3]. For TTI #9, since initial transmission is performed, an HARQ channel number having the lowest use frequency and the smallest channel number among HARQ channel numbers not belonging to the transmission window is allocated to a coded block to be transmitted. Here, only the HARQ channel number #1 does not belong to the transmission window, so the Node B allocates the HARQ channel number #1 to the coded block data and transmits the coded block data for the TTI #9. The same operations are repeated until TTI #18.

Summarizing, the Node B allocates an HARQ having the lowest use frequency and the smallest channel number among HARQ channel numbers not belonging to the transmission window to an initial-transmission coded block data, and allocates the same HARQ channel number as the HARQ channel number used for initial transmission to a retransmission coded block.

Next, an operation of the UE will be described. First, the UE receives a coded block data #1 for TTI #1 in step 601, and updates the reception window by adding an HARQ channel number #1 to the reception window in step 602. In step 602, after updating the reception window, the UE performs a CRC operation to determine whether an error has occurred in the coded block data #1. As a result of the CRC result, the UE transmits ACK or NACK to the Node B in step 603. Since it is assumed in FIG. 8 that no error occurs in the HARQ channel number #1, the UE transmits ACK signal to the Node B in step 603. For TTI #2, the UE receives a coded block data #2 and updates the reception window by adding the HARQ channel number #2 to the reception window. Since it is assumed that an error occurs in the coded block data #2, the UE transmits NACK signal as feedback information for the coded block data #2 in step 603, and after completion of transmitting the NACK, updates the retransmission window 806 of FIG. 8 in step 604. Here, the retransmission window can be updated for TTI #5 represented by reference numeral 807, or earlier or later than the TTI #5. This is because although it is assumed that NACK signal for the defective coded block data is transmitted, 3 TTIs after the defective coded block data was received, the NACK signal can be actually transmitted earlier or later than the 3 TTIs from the TTI where the defective coded block data was received. However, the retransmission window updating point does not affect an operation of the present invention. After updating the retransmission window, the UE sets a valid retransmission period for the corresponding HARQ channel number to 5 TTIs. That is, the UE sets the valid retransmission period for the coded block data #2 to TTI #7. In this manner, the UE performs the same operation even on a coded block data #3, updates the retransmission window, and sets a valid retransmission period.

A next initial-transmission HARQ channel number and a next retransmission HARQ channel number, calculated by the UE for the TTI #6, are 1 and 2, respectively, and TTI #7 is a valid retransmission period-expired interval for the coded block data #2. Therefore, the next HARQ channel number should be 2. However, since the coded block data #2 is received for the TTI #7 in FIG. 8, no communication error has occurred. Therefore, upon receiving the coded block data #2 for the TTI #7, the UE transmits the coded block data #2 to the corresponding HARQ channel buffer, to soft combine the received coded block data #2 with a coded block previously buffered in the corresponding HARQ channel buffer, and then deletes the HARQ channel number #2 from the retransmission window 806.

Summarizing, the UE calculates a next initial-transmission HARQ channel number and a next retransmission HARQ channel number for each TTI. If the next TTI is a valid retransmission period-expired interval for an arbitrary HARQ channel number belonging to the retransmission window, the UE determines whether the next retransmission HARQ channel number is identical to an HARQ channel number received for the next TTI. If the next TTI is not the valid retransmission period-expired interval, the UE determines whether the HARQ channel number received for the next TTI is identical to the next initial-transmission HARQ channel number or the next retransmission HARQ channel number, thereby to check occurrence of a communication error.

Hitherto, with reference to FIG. 8, the description has been made of an exemplary method of allocating HARQ channel numbers in the case where no communication error has occurred. Next, an exemplary method of allocating HARQ channel numbers in the case where a communication error has occurred will be described with reference to FIG. 9.

FIG. 9 illustrates an exemplary method of allocating HARQ channel numbers in the case where a communication error has occurred, according to an embodiment of the present invention. In FIG. 9, transmission channel numbers 901, TTI numbers 902, a transmission window 903, reception channel numbers 904, a reception window 905, and a retransmission window 906 are identical in their fundamental functions to the transmission channel numbers 801, the TTI numbers 802, the transmission window 803, the reception channel numbers 804, the reception window 805, and the retransmission window 806 of FIG. 8, respectively, so a detailed description thereof will not be provided. However, it should be noted in FIG. 9 that a part drawn by a dotted-line in a TTI unit indicates TTIs where coded blockade are transmitted to other UEs rather than a corresponding UE.

Referring to FIG. 9, a Node B transmits initial-transmission coded block data for TTI #1, TTI #2 and TTI #3, and updates the transmission widow 903 according to the transmitted coded block data. It is assumed in FIG. 9 that although a UE transmitted NACK signal due to an error occurred in a coded block data #2, a Node B mistakes the NACK signal for ACK signal. Then the Node B allocates HS-DSCH transmission resources to other UEs rather than the corresponding UE for TTI #4, TTI #5 and TTI #6, and resumes transmission to the corresponding UE for TTI #7. Although the TTI #7 is a valid retransmission period-expired interval for the coded block data #2, the Node B does not recognize this fact. Therefore, the Node B transmits an initial-transmission coded block data allocated an HARQ channel number #4. For the TTI #5, the UE adds the HARQ channel number #2 to the retransmission window 906. Upon receiving a coded block data #4 for the TTI #7, the UE that has previously set a valid retransmission period for the coded block data #4 to the TTI #7, deletes the HARQ channel number #2 from the retransmission window 906 and recognizes occurrence of a communication error. To overcome the communication error, the UE may discard a coded block data buffered in an HARQ channel buffer corresponding to the HARQ channel #2. TTI #8 is a valid retransmission period-expired interval for a coded block #3. Since the coded block data #3 is received for the TTI #8, no communication error occurs. A call drop occurs again for TTI #9, and a coded block data #5 is transmitted/received for TTI #10. For the TTI #9, a next initial-transmission HARQ channel number calculated by the UE is 5, but no next retransmission HARQ channel number exists. Therefore, the UE regards the coded block data #5 received for the TTI #10 as a normal initially-transmitted coded block. If it is assumed that an error occurred in the coded block transmitted/received for the TTI #10, the UE transmits NACK signal for the defective coded block data, updates the retransmission window 906 by adding the HARQ channel number #5 to the retransmission window 906, and sets a valid retransmission period-expired interval to TTI #15. Since it is assumed in FIG. 9 that a call drop occurs again for the TTI #15, the above-stated exceptional regulations are applied to expiration of a valid retransmission period for the coded block data #5. That is, expiration of the valid retransmission period due to the call drop extends expiration of the valid retransmission period from a point where a call is resumed to an $x^{th}$ TTI. Here, x means a corresponding HARQ channel number in the retransmission window 906, and in FIG. 9, the x becomes 1 since the HARQ channel number #5 is the only element in the retransmission window 906. That is, in FIG. 9, a valid retransmission period-expired interval for the coded block data #5 is reset to TTI 16.

The present invention has been described with reference to an example where the n-channel SAW HARQ uses (n+1) channel numbers. In some cases, however, the n-channel SAW HARQ may use (n+2) or (n+3) channel numbers. For example, if n=6 in the n-channel SAW HARQ, a minimum of 3 bits are needed to express HARQ channel numbers. Since the 3 physical bit resources can express 3 cases, it is possible to increase efficiency of the resources by using 8 or (n+2) channel numbers. Like this, the present invention can be realized in the same manner even though (n+2) channel numbers are used. That is, the method of updating a transmission window and allocating HARQ channel numbers by the Node B, and the method of updating a reception window and a retransmission window and analyzing HARQ channel numbers by the UE can be realized in the same manner no matter whether the number of channel numbers is (n+1), (n+2) or (n+x). The number of channel numbers to be used depends upon the number n of the HARQ channels.

Next, a method of allocating channel numbers in another way will be described. This method is identical to the above-described methods in a process of updating a transmission window by the Node B, a process of determining a next HARQ channel number by the Node B, and a valid retransmission period defined for an arbitrary retransmission coded block data. However, unlike in the above-described methods, the UE does not construct a reception window. Therefore, after transmitting NACK signal for an arbitrary coded block, the UE updates a retransmission window about this fact, and simply determines whether a coded block data with the same HARQ channel number arrives within a valid retransmission period. If a coded block data, having the same HARQ channel number as the coded block data that transmitted the NACK signal is received within the valid retransmission period, the UE soft-combines the coded block data having the same HARQ channel number. Alternatively, the UE regards all the other received coded blocks except the coded block previously stored in the HARQ channel buffer and the coded block data having the same HARQ channel number, as new coded block data or initial-transmission coded block data. This method aims at preventing two totally different coded block data from being soft-combined, and at taking no special measure on the communication errors.

Therefore, in the HSDPA communication system employing the n-channel SAW HARQ, the present invention properly allocates a channel number for indicating a state of a coded block data transmitted, thereby making it possible to remove a transmission resource used to transmit the state information of the coded block data. Removing the transmission resource used to transmit the state information of the coded block data contributes to a minimized waste of the transmission resources, resulting in an improvement in the overall system capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for allocating channel numbers to channel signals by a Node B, which transmits a stream of n channel signals to a UE (User Equipment), the n channel signals having (n+1) different channel numbers, the method comprising the steps of:

storing channel numbers of the n channel signals in a transmission window, and updating channel numbers when node B transmits each of the channel signals; and allocating the same channel number as a channel number used for initial transmission to a channel signal to be transmitted if the channel signal to be transmitted is a retransmission signal, and allocating a channel number not belonging to the transmission window among the (n+1) channel numbers to a channel signal to be transmitted if the channel signal to be transmitted is an initial-transmission channel signal.

2. The method of claim 1, wherein the step of allocating the channel number to the initial-transmission channel signal comprises the step of allocating a channel number having the lowest frequency of use among the channel numbers not belonging to the transmission window.

3. The method of claim 1, wherein the step of allocating the channel number to the initial-transmission channel signal comprises the step of allocating, if there are a plurality of channel numbers having the lowest frequency of use among the channel numbers not belonging to the transmission window, the smallest channel number among the channel numbers having the lowest frequency of use to the initial-transmission channel signal.

4. A method for receiving n channel signals, which a Node B transmits, the n channel signals having (n+1) different channel numbers, the method comprising the steps of:

receiving a channel number of the channel signal;

determining whether the channel signal is initially transmitted or retransmitted by the received channel number such that the channel signals are determined to be initially transmitted if no error occurred in the channel signal and the channel number of the channel signal is a channel number having the lowest frequency of use among channel numbers not belonging to a reception window;

allocating, if initially transmitted, a channel number to an initial transmission;

extracting available channel numbers in determining the channel number;

determining, if there exists only one channel number with a lowest frequency of use among the extracted channel numbers; and updating the reception window by the determination step.

5. The method of claim 4, wherein the step of determining whether a channel signal is initial transmitted or retransmitted comprises the step of determining the channel signal as retransmitted data, if no error occurred in the channel signal and the channel number of the channel signal is an channel number first stored in the retransmission window.

6. The method of claim 4, further comprising the step of determining that a communication error has occurred, if no error occurred in the channel signal, the channel signal is not initially transmitted data or retransmitted data and there exists a channel number with an expired valid retransmission period in the retransmission window.

7. The method of claim 6, wherein the valid retransmission period indicates a fixed time point where the Node B can retransmit arbitrary data.

8. The method of claim 6, wherein if a call drop occurs, the Node B extends the valid retransmission period by an interval where the call drop has lasted.

9. A method for allocating an HARQ (Hybrid Automatic Retransmission Request) channel number for indicating data state information in a high-speed packet transmission system, which transmits data over n HARQ channels, and the HARQ channels each have a channel number among (n+1) different channel numbers, the method comprising the steps of:

if there is data to be transmitted for an arbitrary TTI (Transmission Time Interval), determining whether the data is initial-transmission data or retransmission data;

if the data is initial-transmission data, allocating an HARQ channel number as an HARQ channel number of the initial-transmission data, the allocated HARQ channel number not belonging to a transmission window having HARQ channel numbers of data to be transmitted for n TTIs before the arbitrary TTI; and if the data is retransmission data, allocating to the retransmission data the same HARQ channel number as an HARQ channel number allocated to the initial-transmission data.

10. The method of claim 9, wherein the step of allocating the HARQ channel number of the initial-transmission data comprises the step of allocating an HARQ channel number having the lowest frequency of use among HARQ channel numbers not belonging to the transmission window.

11. The method of claim 9, wherein the step of allocating the HARQ channel number of the initial-transmission data comprises the step of allocating the smallest HARQ channel number among HARQ channel numbers not belonging to the transmission window.

12. The method of claim 9, wherein the step of allocating the HARQ channel number of the initial-transmission data comprises the step of allocating, if there are a plurality of channel numbers having the lowest frequency of use among the channel numbers not belonging to the transmission window, the smallest channel number among the channel numbers having the lowest frequency of use.

* * * * *